United States Patent [19]

Shieh

[11] Patent Number: 4,601,263

[45] Date of Patent: Jul. 22, 1986

[54] APPARATUS FOR SUPPLYING BOILED WATER

[76] Inventor: Tzyy D. Shieh, No. 7, La. 348, Sec. 2, Chang Nan Rd., Hsang San Li, Chang Hua, Taiwan

[21] Appl. No.: 750,750

[22] Filed: Jun. 28, 1985

[51] Int. Cl.⁴ ............................................... F22B 5/00
[52] U.S. Cl. .................................. 122/13 A; 122/4 A; 126/361; 126/362; 219/333
[58] Field of Search ............... 122/4 A, 13 A, 406 R, 122/429, 431; 126/361, 344, 362; 219/319, 310, 323, 325, 333, 306; 137/340, 341

[56] References Cited

U.S. PATENT DOCUMENTS

| 983,548 | 2/1911 | Gale | 122/4 A |
|---|---|---|---|
| 4,320,702 | 3/1982 | Shein et al. | 122/13 A |
| 4,354,094 | 10/1982 | Massey et al. | 219/333 X |
| 4,455,475 | 6/1984 | Giorgetti | 219/333 X |

Primary Examiner—Edward G. Favors
Attorney, Agent, or Firm—Steele, Gould & Fried

[57] ABSTRACT

A boiled water supplying apparatus which includes: a water heating closed tank having a water inlet and a water outlet; a conduit having one open end thereof connected to the water outlet and the other open end thereof arranged at a level higher than the water outlet; a water level regulating means for maintaining the water level in the water heating tank at a level lower than that of the other open end of the conduit; and a heating unit provided in the water heating tank for boiling the water; whereby the water can only be forced to flow out of the water heating tank by the vapor pressure of the boiling water. Downstream from the tank are provided a filter means, a hot water receiving tank and a heat exchange unit which can preheat the ingoing cold water of the water heating tank with the boiled water.

10 Claims, 2 Drawing Figures

APPARATUS FOR SUPPLYING BOILED WATER

BACKGROUND OF THE INVENTION

This invention relates to a drinking water supplying apparatus and particularly to a drinking water supplying apparatus including a water heating tank which sends out the water by the force of the vapor pressure of the boiling water so that only the boiled water can flow out of the apparatus.

Drinking water supplying apparatus typically include a water heating pipe through which the cold water flows and is heated by a heating coil provided around the heating pipe. Since the temperature and the flow rate of the ingoing water can not be always kept constant, and the scale formed inside the pipe affects the heat transfer into the pipe in some degree, such apparatus cannot provide actually boiled water when a large quantity of drinking water is taken out from the apparatus. Moreover, in order to boil the water flowing in the pipe, it is necessary to increase the length of the heating coil as well as the heating pipe since the heat conducting effect of the pipe is limited and the flowing water can only receive part of the heat from the heating coil. This increases the power consumption.

There is also another type of drinking water supplying apparatus which includes a filter to clean the water. However, if replacement of the filter is neglected, the filter may become an ideal enviroment for breeding bacteria.

SUMMARY OF THE INVENTION

An object of the invention is to provide an improved drinking water supplying apparatus which can provide a large quantity of actually boiled drinking water with reduced heat energy consumption.

Another object of the invention is to provide a drinking water supplying apparatus capable of producing drinking water which has been subjected to a super-sterilizing temperature treatment.

These and other objects can be achieved in accordance with the present invention through the provision of a boiled water supplying apparatus which is comprised of a water heating closed tank having a water inlet and a water outlet which is located at a level lower than that of the water inlet, a conduit having one open end thereof connected to the first water outlet and the other open end thereof arranged at a level higher than the water outlet of the tank, a water level regulating means for maintaining the water level in the water heating tank at a level lower than that of the other open end of the conduit.

The regulating means includes a valve means for regulating the water flow through the water inlet of the tank and a float body connected to the valve means. There is further provided a heating unit in the water heating tank for boiling the water. In this apparatus, the water can only be forced to flow out of the water heating tank by the vapor pressure of the boiling water.

The water heating tank may be further provided with an opening at its bottom side for the removal of sediment. Downstream from the heating tank is a filter means which is connected to the tank by means of the conduit. Inside the tank is a means for de-energizing and energizing the heating unit, corresponding to the water level in the water heating tank.

In one aspect of the invention, the apparatus further includes a first hot water receiving tank which is connected to the filter means and has a first faucet provided at the bottom side thereof.

In another aspect of the invention, the apparatus further includes a heat exchange unit provided downstream of the filter means and connected thereto for preheating the cold water with the boiled water before the cold water enters the water heating tank.

The heat exchange unit may include a plurality of second hot water receiving tanks interconnected in series. Each of the second hot water receiving tanks is provided with a cold water chamber therein. The cold water chambers are communicated with each other and are connected to a water source. One of the cold water chambers is communicated with the water heating tank. Each hot water receiving tank is provided with a faucet at the bottom side thereof.

Alternatively, the heat exchange unit may include an outer pipe for the flow of the hot water and an inner pipe for the flow of the cold water. To minimize the heat energy losses, there is further provided means for insulating the water heating tank and the heat exchange unit.

The present exemplary preferred embodiment will be described in detail with reference to the following drawings, in which:

DETAILED DESCRIPTION OF THE PREFERRED EMBODIMENT

Figure 1:
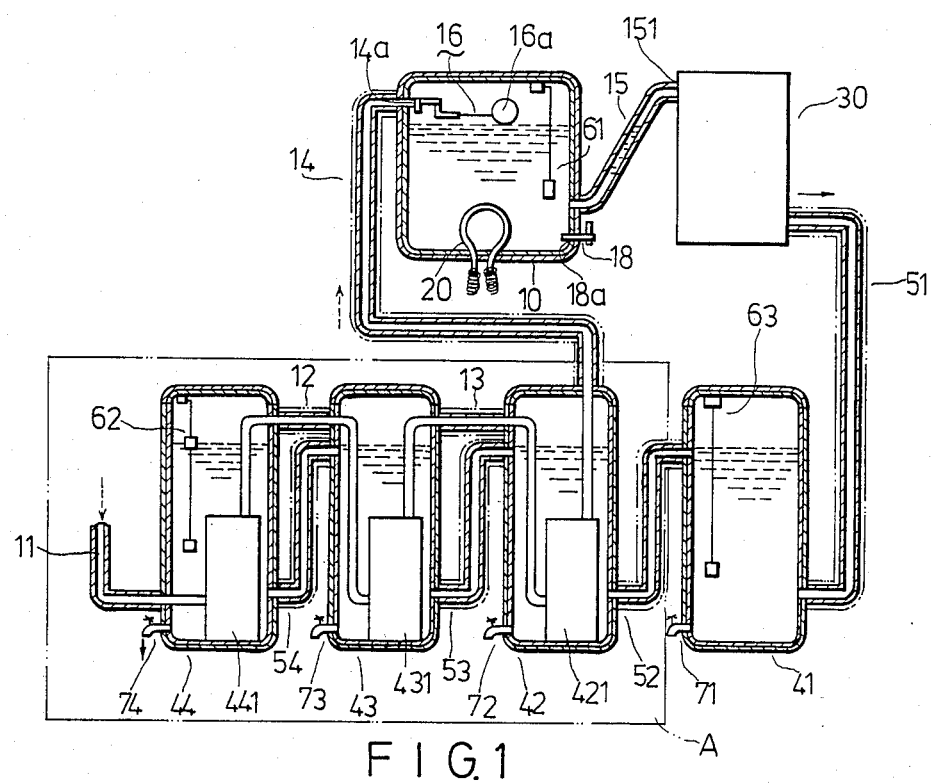
FIG. 1 is a schematic view of a boiled water supplying apparatus embodying the present invention.

Referring to FIG. 1, there is shown a boiled water supplying apparatus which includes a water heating tank 10, a heating unit 20, a filter 30 and a heat exchange unit A.

The water heating tank 10 has its upper portion communicated with an inlet water conduit 14 and its lower portion communicated with an outlet water conduit 15. The outlet water conduit 15 is bent upwards so that the outlet end 151 thereof is higher than the outlet of the tank 10. A water level regulating means 16 is further provided in the upper portion of the tank 10, this being a known device which includes a floating body 16a connected to a valve disposed at the water inlet 14a. The regulating means 16 will maintain the level of the water in the tank 10 at a predetermined height which is not higher than the outlet end 151 of the conduit 15 so that the water in the tank 10 can not flow out under normal conditions.

The heating unit 20 includes a known heating coil which is provided at the bottom side of the tank 10 in a manner known by those skilled in the art. There is further provided a control means 61 which, when the water level has been lowered to a predetermined low level and the ingoing water has ceased to flow in due to the shortage of the water, will deenergize the heating unit. This control means 61 is a known device and therefore the details thereof are not herein described. At the bottom side of the wall of the tank 10 is provided a threaded hole 18a into which is threaded an adaptor 18 by means of which a thermometer is attached. If the sediment in the tank 10 need to be removed, the adaptor 18 may be detached, the sediment washed out and removed through the opening 18a. The outlet end 151 of the outlet water conduit 15 is connected to a filter 30.

There is further provided a first hot water receiving tank 41 which is communicated with the filter 30 by means of a conduit 51. At the bottom side of the tank 41 is provided a faucet 71 from which one may get a hot boiled water. Inside the tank 41 is provided a control means 63 which is similar to the control means 61 and is adapted to energize the heating unit 20 when the water level in the tank 41 is lowered to a predetermined low level. Downstream from the tank 41 is provided a heat exchange unit A. The heat exchange unit A is comprised of three hot water tanks 42, 43 and 44. The tank 42 is connected to the tank 41 by means of a conduit 52. In the tanks 42, 43 and 44 are provided three cold water chambers 421, 431 and 441 respectively. A conduit 11 is provided to connect the cold water chamber 441 to a water source. The cold water chambers 441 and 431 are interconnected by a cold water conduit 12, and the cold water chambers 431 and 421 are interconnected by a cold water conduit 13. The cold water chamber 421 is in turn connected to the water heating tank 10 by means of a conduit 14. There are further provided a hot water conduit 53 which interconnects the hot water tanks 42 and 43, and a hot water conduit 54 which interconnects the hot water tanks 43 and 44.

The water from the water source first enters into the cold water chamber 441, passes through the cold water chambers 431 and 421, and then enters into the water heating tank 10. The hot water from the water heating tank 10 is directed to the filter 30 and thence to the hot water tanks 41, 42, 43, and 44 is succession via the conduits 15, 51, 52, 53 and 54.

When the water in the tank 10 is not being boiled, it cannot enter into the filter 30 since the water level is always maintained at a height below the end 151 of the conduit 15 by a regulating means 16.

It is known that the boiling point of water under the atmosphere is 100 degrees, and the boiling point increases with the increase in pressure. When the water in the tank 10 boils, the pressure is increased. Accordingly, the boiling point of the water is also increased. In this situation, the vapor pressure in the tank 10 forces the water to flow out through the conduit 15. When the water level in the tank 10 becomes lower, the regulating means 16 will allow the cold water to be supplemented through the conduit 14. At the supplementation of the cold water, the pressure in the tank 10 decreases and the hot water ceases to flow to the filter 30. However, since the water is continuously heated, it will be boiled again and then flow to the filter 30.

The boiled water which comes out from the filter 30 is then sent into the hot water tanks 41, 42, 43 and 44. In the tanks 41, 42, 43 and 44, the heat of the hot water is transferred to the cold water present in the chambers 441, 431 and 421. At the bottom sides of the tanks 42, 43 and 44 are provided water faucets 72, 73 and 74 respectively from which the colled boiled water of different temperatures can be obtained. Since the cold water is preheated in the hot water tanks 41, 42, 43 and 44 before it is supplied to the tank 10, a large portion of the power consumption can be saved.

There is further provided in the tank 44 a control switch 62 similar to the control means 61. This control switch 62 will de-energize the heating unit 20 when the water level in the tank 44 reaches a predetermined higher level and will energize the heating unit 20 when the water level is lower than a predetermined low level.

To minimize loss of heat, the tanks 10, 41, 42, 43 and 44 and the conduits can be insulated by a heat insulating material.

Figure 2:
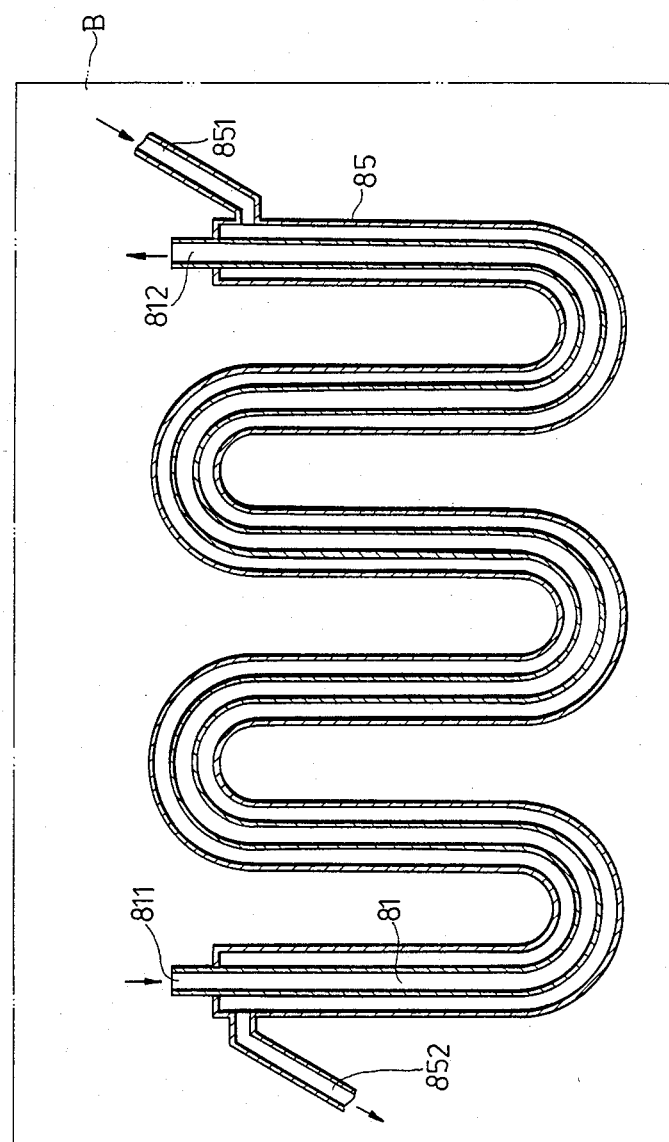
FIG. 2 is a schematic view of an alternative heat exchange unit of the apparatus.

Referring to FIG. 2, there is shown an alternative heat exchange unit B which can be provided downstream either from the filter 30 or from the tank 41. The unit B includes an outer pipe 85 and an inner pipe 81. The cold water enters into the inner pipe 81 from the inlet 811 and flows out through the outlet 812. The hot water which passes through the filter 30 enters into the outer pipe 85 from the inlet 851 and is discharged through the outlet 852.

As described above, since the cold water is preheated in the heat exchange unit A or B, the water can reach a temperature above 90 degress before the water flows into the tank 10. Therefore, boiled water is rapidly supplied to the hot water tanks so that a large quantity of boiled water can be supplied with saved heat energy. Moreover, the boiling temperature of the water that is forced to flow out of the tank 10 is always higher than 100 degrees since the pressure in the tank 10 is higher than 1 atmosphere. Accordingly, the water obtained from the apparatus of the invention has been subject to a super-sterilizing temperature treatment.

With the invention thus explained, it is apparent that various modifications and variations can be made without departing from the scope of the invention. It is therefore intended that the invention be limited as indicated in the appended claims.

What I claim is:

1. A boiled water supplying apparatus comprising:
    a water heating closed tank having a bottom, a top and a side wall, said wall being provided with a first water inlet and a first water outlet which is located at a level lower than that of said water inlet;
    a first conduit having one open end thereof connected to said first water outlet and the other open end thereof arranged at a level higher than said first water outlet;
    a water level regulating means for maintaining the water level in said water heating tank at a level lower than that of said other open end of said first conduit, said regulating means including a valve means for regulating the water flow through said first water inlet and a float body connected to said valve means; and
    a heating unit provided in said water heating tank for boiling the water; whereby the water can only be forced to flow out of said water heating tank by the vapor pressure of the boiling water.

2. A boiled water supplying apparatus as claimed in claim 1, wherein said water heating tank is provided with an opening at its bottom side for the removal of sediment.

3. A boiled water supplying apparatus as claimed in claim 1, further including a filter means connected to said other open end of said first conduit.

4. A boiled water supplying apparatus as claimed in claim 1, wherein said water heating tank is further provided with a means for de-energizing and energizing said heating unit in response to the water level in said water heating tank.

5. A boiled water supplying apparatus as claimed in claim 3, further including a first hot water receiving tank which is connected to said filter means and has a first faucet provided at the bottom side thereof.

6. A boiled water supplying apparatus as claimed in claim 3, further including a heat exchange unit provided downstream of said filter means and connected thereto for preheating the cold water with the boiled water before the cold water enters said water heating tank.

7. A boiled water supplying apparatus as claimed in claim 6, wherein said heat exchange unit includes a plurality of second hot water receiving tanks interconnected in series, each of said second hot water receiving tanks having a cold water chamber provided thereinside, said cold water chambers being intercommunicated and connected to a water source, one of said cold water chambers being communicated with said water heating tank.

8. A boiled water supplying apparatus as claimed in claim 7, wherein each of said second hot water receiving tanks is provided with a second faucet at the bottom side thereof.

9. A boiled water supplying apparatus as claimed in claim 6, wherein said heat exchange unit includes an outer pipe for the flow of the hot water and an inner pipe for the flow of the cold water.

10. A boiled water supply apparatus as claimed in claim 6, further including means for insulating said water heating tank and said heat exchange unit.

* * * * *